April 2, 1935. G. E. GAUS 1,996,328

APPARATUS FOR AFFIXING IDENTIFICATION TAGS

Filed Dec. 16, 1932

INVENTOR
George E. Gaus
By
Attorney

Patented Apr. 2, 1935

1,996,328

UNITED STATES PATENT OFFICE 1,996,328

APPARATUS FOR AFFIXING IDENTIFICATION TAGS

George E. Gaus, Washington, D. C.; dedicated to the free use of the Government and the People Application December 16, 1932, Serial No. 647,598

2 Claims. (Cl. 100—14)

(Granted under the act of March 3, 1883, as amended April 30, 1928; 370 O. G. 757)

This application is made under the act of March 3, 1883, as amended by the act of April 30, 1928, and the invention herein described may be manufactured and used by or for the Government for governmental purposes without the payment to me of any royalty thereon.

I hereby dedicate the invention to the free use of the Government and the people of the United States.

My invention relates to affixing identification tags to bales of fibrous materials, particularly cotton, whereby the particular bales to which the tags have been applied may be identified in the event the customary means of identification are effaced, destroyed, or changed and has for its object to provide a simple method for inserting within the bale during the process of baling a durable identification tag arranged in such a manner that it cannot readily be removed or replaced after the fibrous material has been baled.

In order to carry out the purposes of my invention reference is to be had to the peculiar combinations and arrangement of parts as shown in the accompanying drawing forming a part of this specification, in which similar numerals refer to similar parts throughout the several views.

Tag head or plate 1, of convenient shape and size, visible on the outer surface of the bale (Fig. 3), is secured to shank 2 by any conventional means. Shank 2 may be of any suitable metallic or non-metallic material and either corrugated, spiral, fluted, barbed, or any other shape which will resist withdrawal from baled material 10. The end of shank 2 terminates in an anchor device 3 which may consist of a barb disc, button, knot or any other form which will increase resistance to withdrawal of shank 2 from baled material 10. The length of shank 2 should be slightly less than the transverse distance between the sides of the bale.

Figure 1:
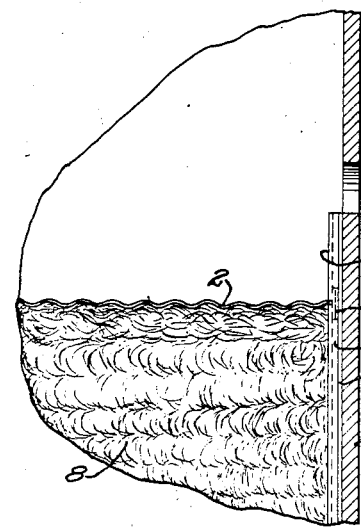
Fig. 1 is a cross-section view of a press-box illustrating the identification tag assembly and tag slide-guide attached to the interior of the conventional type of press-box side, with opening above the slide-guide for insertion of the marker or identification tag, depicted in position in the slide-guide as resting upon approximately one-half the bulk of the material used in the completed bale.
Figure 2:
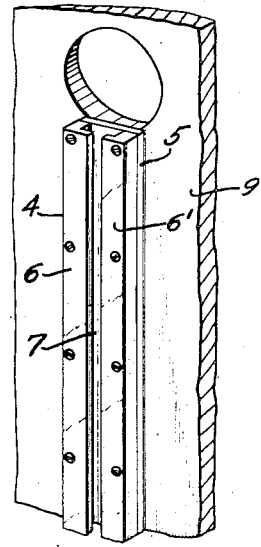
Fig. 2 is a perspective view of the tag slide-guide attached to the interior of a section of a conventional type of press-box side.

Referring to Fig. 2 it will be seen that tag slide-guide 4 is attached to the interior of press-box side 9 having an aperture in press-box side 9 for insertion of identification tag assembly 1—2. Slide-guide 4 is formed with backing plate 5 to which is attached angle cover plates 6 and 6'. Angle cover plates 6 and 6' are placed parallel at a sufficient distance apart to form T slot 7, admitting freely identification tag assembly 1—2. The upper end of T slot 7 terminates at an aperture in press-box side 9 below the center line of the completed bale. This aperture in press-box side 9 permits the insertion of the identification means into T slot 7 during the process of baling.

Figure 4:
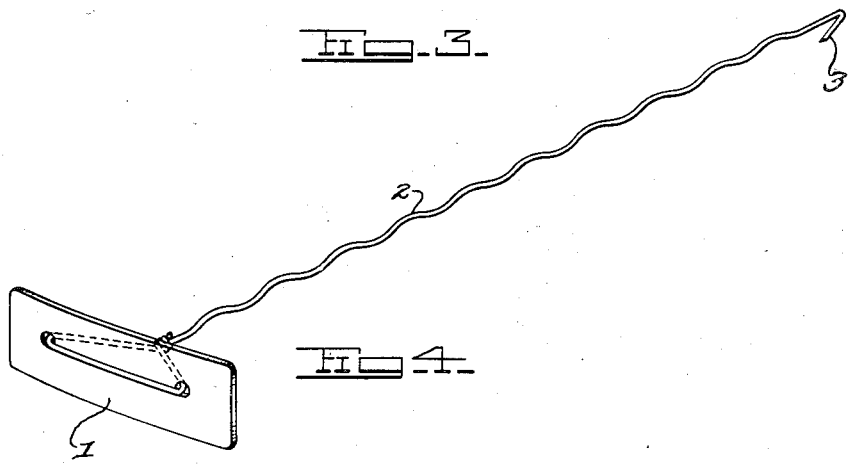
Fig. 4 is a perspective view of the marker or identification tag assembly.

My invention may be practiced while fibrous material 8 is being fed into the press-box and at a time when the press-box is approximately one-half filled, by inserting identification assembly 1—2, Fig. 4, with anchor device 3 foremost, through an aperture in the press-box located at the top of slide-guide 4. Tag head 1 is inserted within T slot 7 of slide-guide 4, with shank 2 projecting horizontally therefrom. Identification tag assembly 1—2 slides freely down slide-guide 4 coming to rest on fibrous material 8, and is covered with the remainder of the fibrous material forming the bale.

During the compression of fibrous material 8, identification tag assembly 1—2 moves vertically of the compressing direction, emerging from the end of slide-guide 4 with shank 2 firmly held within the bale.

Figure 3:
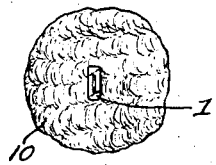
Fig. 3 illustrates an area of the side of the completed bale with the tag head of the marker or identification tag visible on the outer surface of the bale.

Upon completion of the baling process, tag head 1, Fig. 3, in intimate contact with the surface of the baled material 10, appears in the mid-area of the side of the bale not covered by the bale covering, or tare.

While the foregoing is a preferred embodiment of the means for practicing my invention, I do not wish to be restricted thereto.

Having thus described my invention, I claim as new and desire to secure by Letters Patent:

1. In combination with a baler having an opening formed in a side wall thereof, of a longitudinally slotted, open-ended, channel-like tag holder communicating therewith and interiorly affixed to said baler, said holder being disposed within said baler so as to carry a nail-like identification tag lengthwise thereof in the plane of movement of and during engagement with the fibrous material as the same is being formed into a bale, and adapted to ultimately effect the release of the tag from the holder.

2. A combination of baler and an apparatus for securing nail-like identification tags to fibrous material during the process of baling, comprising a baler having means of access to its interior formed in a side wall thereof, a longitudinally slotted, open-ended, channel-like tag holder affixed interiorly lengthwise to the side of said baler and communicating with said means of access, said holder adapted to guide and carry the tag in a plane with its anchoring member normally disposed within the baler and in position to be engaged and moved with the fibrous material as it is being formed into a bale, and adapted to ultimately effect the release of the tag from the holder.

GEORGE E. GAUS.